US011247537B2

(12) United States Patent
Chevalier

(10) Patent No.: US 11,247,537 B2
(45) Date of Patent: Feb. 15, 2022

(54) POSITIVE PRESSURE VENT FOR A VEHICLE

(71) Applicant: Dometic Sweden AB, Solna (SE)

(72) Inventor: Nicolas Christophe Gilles Chevalier, Camberwell (AU)

(73) Assignee: Dometic Sweden AB, Solna (SE)

( * ) Notice: Subject to any disclaimer, the term of this patent is extended or adjusted under 35 U.S.C. 154(b) by 596 days.

(21) Appl. No.: 16/080,924

(22) PCT Filed: Feb. 28, 2017

(86) PCT No.: PCT/IB2017/051153
§ 371 (c)(1),
(2) Date: Aug. 29, 2018

(87) PCT Pub. No.: WO2017/149442
PCT Pub. Date: Sep. 8, 2017

(65) Prior Publication Data
US 2020/0215879 A1   Jul. 9, 2020

(30) Foreign Application Priority Data

Feb. 29, 2016 (AU) .............................. 2016900723

(51) Int. Cl.
*B60H 3/06* (2006.01)
*B60H 1/26* (2006.01)
(Continued)

(52) U.S. Cl.
CPC ........... *B60H 3/0641* (2013.01); *B60H 1/245* (2013.01); *B60H 1/262* (2013.01); *B60H 3/06* (2013.01);
(Continued)

(58) Field of Classification Search
CPC ............ B60H 1/00364; B60H 1/00378; B60H 1/245; B60H 1/262; B60H 3/06; B60H 3/0616; B60H 3/0641
(Continued)

(56) References Cited

U.S. PATENT DOCUMENTS 2,232,108 A * 2/1941 Giacomini ............... B60H 1/30
454/136
2,550,353 A    4/1951 Bernard
(Continued)

FOREIGN PATENT DOCUMENTS

AU   2007288110 B2   10/2013
AU   2017232204 A1   4/2018
(Continued)

OTHER PUBLICATIONS

U.S. Appl. No. 16/881,529 entitled "Dust Reduction System" filed on May 22, 2020.
(Continued)

*Primary Examiner* — Steven B McAllister
*Assistant Examiner* — Benjamin W Johnson
(74) *Attorney, Agent, or Firm* — Middleton Reutlinger

(57) ABSTRACT

According to the invention, there is provided a positive pressure vent for a vehicle. The vent includes an inlet chamber having an air intake port facing into an air stream generated by motion of the vehicle so as to collect air and form a positive pressure inside the inlet chamber. There is further provided a filter adapted to filter air from the inlet chamber of particulate matter. A filtered air path is further provided for allowing filtered air from the filter to travel to the interior of the vehicle under the urging of the positive pressure from the inlet chamber.

20 Claims, 6 Drawing Sheets

(51) Int. Cl.
*B60H 1/24* (2006.01)
*B60H 1/00* (2006.01)

(52) U.S. Cl.
CPC ....... *B60H 3/0616* (2013.01); *B60H 1/00364* (2013.01); *B60H 1/00378* (2013.01)

(58) Field of Classification Search
USPC ........................................................ 454/158
See application file for complete search history.

(56) References Cited

U.S. PATENT DOCUMENTS

| | | | |
|---|---|---|---|
| D259,708 S | 6/1981 | Swinstead | |
| 4,530,817 A * | 7/1985 | Holter | B60H 3/0633 422/122 |
| D282,000 S | 12/1985 | Madl | |
| 4,953,449 A * | 9/1990 | Jackson | B60H 1/245 454/138 |
| D344,791 S | 3/1994 | Cunning | |
| D354,343 S | 1/1995 | Goldstein | |
| 5,679,074 A * | 10/1997 | Siegel | B60H 1/28 454/147 |
| D396,526 S | 7/1998 | Boyle | |
| D419,241 S | 1/2000 | Northcott | |
| D429,804 S | 8/2000 | Rossman | |
| D446,577 S | 8/2001 | Barker | |
| D450,111 S | 11/2001 | Stanley | |
| D543,611 S | 5/2007 | Tateishi | |
| D563,538 S | 3/2008 | Verdura | |
| D884,131 S | 5/2020 | Zhu | |
| D903,072 S | 11/2020 | Gu | |
| 2005/0160709 A1 | 7/2005 | Hollis | |
| 2020/0215879 A1 | 7/2020 | Chevalier | |
| 2020/0376933 A1 | 12/2020 | Bilston et al. | |

FOREIGN PATENT DOCUMENTS

| | | | |
|---|---|---|---|
| AU | 2017227050 A1 | 8/2018 | |
| AU | 201916406 A1 | 12/2019 | |
| AU | 201916408 A1 | 12/2019 | |
| AU | 201916409 A1 | 12/2019 | |
| EM | 006567111-0001 | 6/2019 | |
| EM | 006567111-0002 | 6/2019 | |
| EM | 006567111-0003 | 6/2019 | |
| EP | 1122105 A2 * | 8/2001 | ............... B60H 3/06 |
| EP | 1122105 A2 | 8/2001 | |
| EP | 1870270 A1 | 12/2007 | |
| FR | 2391865 A1 | 12/1978 | |
| WO | 2017149442 | 9/2017 | |

OTHER PUBLICATIONS

European Patent Office, International Search Report and Written Opinion for PCT/IB2017/051153 dated May 10, 2017, 11 pages.
CN Patent Application No. 201930646821.6 entitled "Rooftop box for a dust reduction system" filed on Nov. 22, 2019.
AU Patent Application No. 201916406 entitled "Rooftop Air vent" filed on Nov. 11, 2019.
AU Patent Application No. 201916408 entitled "Rooftop Air vent" filed on Nov. 11, 2019.
AU Patent Application No. 201916409 entitled "Rooftop Air vent" filed on Nov. 11, 2019.
Design U.S. Appl. No. 29/715,592 entitled "Filter Housing" filed on Dec. 3, 2019.
Office action CN Patent Application No. 201930646821.6 dated Apr. 13, 2020.
AU Patent Application No. 2016900723 entitled "Dust contol vent" filed on Feb. 29, 2016.
AU Provisional Patent Application No. 2019901797 entitled "Dust reduction device" filed on May 27, 2019.
International Preliminary Report On Patentability Mailed in PCT Patent Application No. PCT/IB2017/051153 dated Sep. 4, 2018.
USPTO, Office Action in U.S. Appl. No. 29/715,592 dated Oct. 4, 2021.

* cited by examiner

POSITIVE PRESSURE VENT FOR A VEHICLE

FIELD OF INVENTION

The present embodiments relate to vents and in particular to a vent for a vehicle.

The embodiments have been developed primarily for use as a positive pressure vent for a vehicle and will be described hereinafter with reference to this disclosure. However, it will be appreciated that the embodiments are not limited to this particular field of use.

BACKGROUND

The following discussion of the prior art is intended to place the invention in an appropriate technical context and enable the associated advantages to be fully understood. However, any discussion of the prior art throughout the specification should not be considered as an admission that such art is widely known or forms part of the common general knowledge in the field.

When travelling in dusty environments, recreational vehicles such as mobile homes and caravans and also mining trucks suffer from dust ingress as a result of a negative pressure which develops inside the vehicle while moving. This negative pressure inside the vehicle is due to the air currents moving around the vehicle, which cause the dusty turbulent air to enter the vehicle through ventilation apertures and general venting, which consequently deposits dust inside.

In order to address this problem, it is known in the prior art to provide a small hatch in the roof of the vehicle called a "pressure hatch" or a "scupper vent". The hatch, when opened at an angle facing towards the direction of motion, scoops air into the vehicle from the passing airstream to force it in into the vehicle and create a net positive pressure inside the vehicle. While such a device is simple, it has a number of drawbacks. Primarily, pressure hatches or scupper vents will only work when they are opened by a user. In this regard, given their position on mobile homes and caravans, they are often difficult to access and as a result, rarely opened. Compounding this problem, even if they are opened, they allow rain to enter the vehicle when opened.

A further problem with pressure hatches or scupper vents is that even if it not raining, gravel, insects and some dust enters through the vent, which is particularly problematic given the position of the vents when installed.

Another known approach to alleviate the problem of dust ingress is to attempt to cover all apertures through which dust may enter the vehicle, such as refrigerator vents and cross-flow vents. This is generally ineffective as it is usually impossible to cover all apertures and also is very time-consuming. This solution can also be dangerous as when cooking gas is used and/or to leave the vents closed when inhabiting the vehicle due to potential suffocation.

A further known and more complex solution implemented on one brand of caravans involves use of a high-pressure tank, pump, filters and low pressure air bladders to always maintain a positive air pressure. This solution is particularly expensive, cumbersome, adds significant weight and is known to be not fully effective.

It is an object of the present embodiments to overcome or ameliorate at least one of the disadvantages of the prior art, or to provide a useful alternative.

It is an object of the present embodiments in at least one preferred form to provide an improved system for the prevention of dust ingress in moving vehicles.

SUMMARY OF THE INVENTION

According to one aspect of the present embodiments, there is provided a positive pressure vent for a vehicle, including:

an inlet chamber having an air intake port facing into an air stream generated by motion of the vehicle so as to collect air and form a positive pressure inside the inlet chamber;

a filter adapted to filter air from the inlet chamber of particulate matter; and a filtered air path for allowing filtered air from the filter into the interior of the vehicle under the urging of the positive pressure from the inlet chamber.

In one embodiment, the filtered air path includes an air feeder channel.

In one embodiment, the filter is a liquid trap filter that causes the collected air to pass through a liquid to filter out the particular matter.

In one embodiment, the liquid trap filter includes a baffle to minimise water splashing during use.

In one embodiment, the liquid trap filter includes a plurality of notches to promote water bubbling through the liquid trap filter.

In one embodiment, the filter is a membrane filter that causes the collected air to pass through a membrane to filter out the particular matter.

In one embodiment, the filter is removable and replaceable from the interior of the vehicle.

In one embodiment, the filter is housed in a filter housing.

In one embodiment, the filter housing is adapted to be positioned inside the vehicle.

In one embodiment, the filter housing includes a hinged cover for accessing and removing the filter.

In one embodiment, the inlet chamber includes a centrally disposed cup formation defining a narrowing air transfer channel on each side for increasing the velocity and directing of the airflow within the inlet chamber.

In one embodiment, the cup formation is generally oval shaped.

In one embodiment, the cup formation is hollow and includes an inner space.

In one embodiment, the inner space is separated by a wall defining a non-filtered area and a filtered area.

In one embodiment, the non-filtered area is in fluid communication with the air transfer channels and the filtered area forms part of the filtered air path.

In one embodiment, the inlet chamber includes an outlet aperture in fluid communication with the air transfer channels In one embodiment, the inlet chamber includes one or more arcuate formations for directing airflow into the outlet aperture.

In one embodiment, the one or more arcuate formations and the outlet aperture are generally disposed at the rear of the inlet chamber.

In one embodiment, the inlet chamber includes at least one water extraction aperture for egress of any collected water.

In one embodiment, the vent includes a flow ventilation channel disposed on each lateral side of the air inlet chamber.

In one embodiment, each cross flow ventilation channel is in fluid communication with the interior of the vehicle.

According to a one aspect, there is provided a positive pressure vent for a vehicle, comprising: an air intake port positioned outside the vehicle and facing into an air stream generated by motion of the vehicle so as to collect air from the air stream into a chamber and form a positive pressure inside the chamber; an opening extending from the chamber to an inside of the vehicle so as to provide a path for ingress of the collected air in the chamber into the interior of the vehicle under the urging of the positive pressure in the chamber; a cover positioned with respect to the aperture so as to prevent rain from entering into the interior of the vehicle; and wherein the opening and the air intake port are sized and shaped so as to maintain a positive interior pressure inside the vehicle above a minimum vehicle speed.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF DRAWINGS

Embodiments of the invention will now be described, by way of example only, with reference to the accompanying drawings in which.

DETAILED DESCRIPTION OF THE PREFERRED EMBODIMENTS

Figure 1:
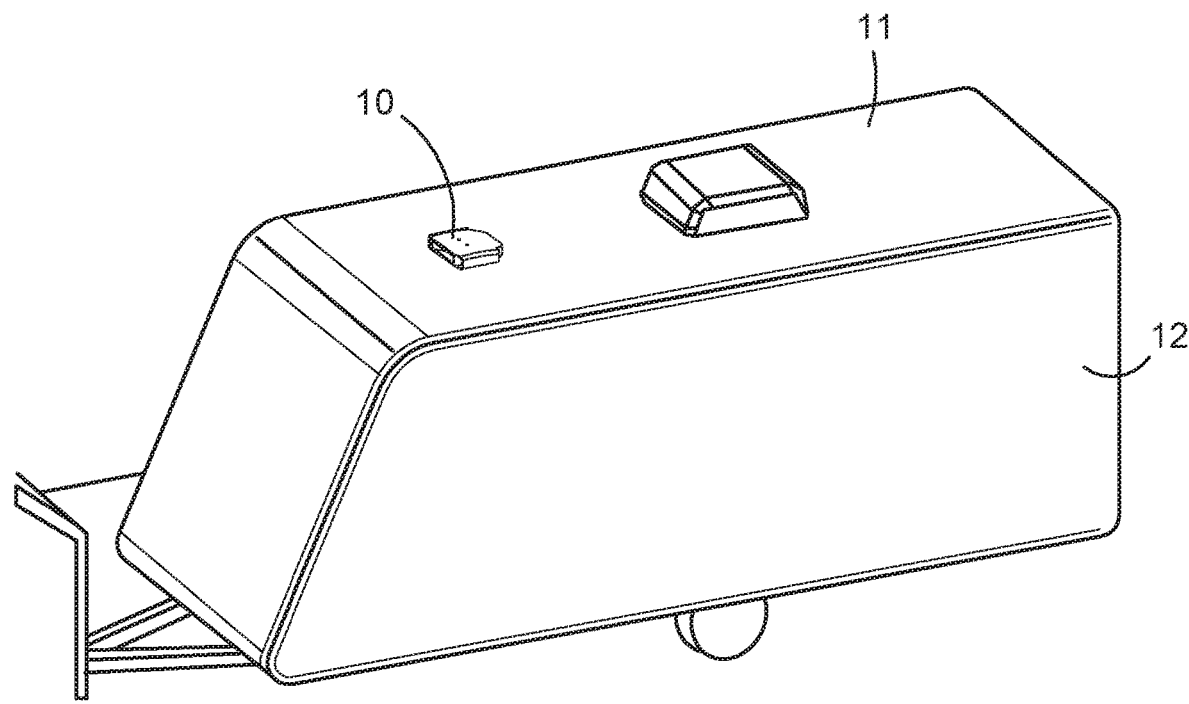
FIG. 1 is a perspective view of a positive pressure vent of a first embodiment of the present embodiments, shown installed on a caravan.

Exemplary embodiments will now be described in detail with reference to the accompanying drawings. In the drawings, the same elements are denoted by the same reference numerals throughout. In the following description, detailed descriptions of known functions and configurations incorporated herein have been omitted for conciseness and clarity.

Figure 2:
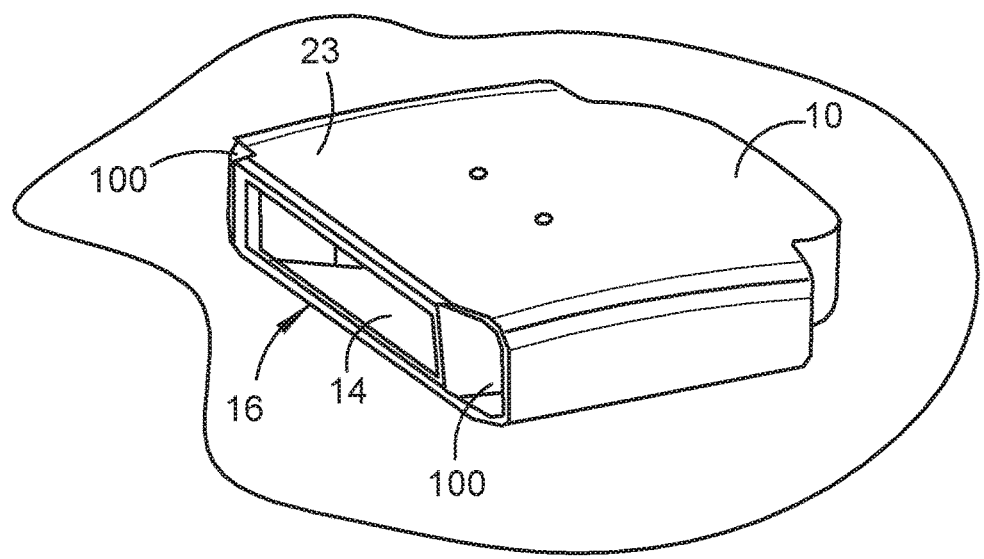
FIG. 2 is an enlarged perspective view of the positive pressure vent of FIG. 1.

Referring to the accompanying drawings and initially to FIGS. 1 and 2, there is shown a positive pressure vent 10 for a vehicle 12 such as a caravan, recreational or mining vehicle. In the present embodiment, the vent 10 is located in the front portion of the roof 11 of a caravan, well away from turbulent flow and substantial dust at a rear of the vehicle. However, in other not shown embodiments, the pressure vent 10 may be placed in any position on a vehicle that has access to airflow due to the forward motion of the vehicle. In one alternative location, the vent may be installed in a hatch in the roof of the vehicle.

Figure 3:
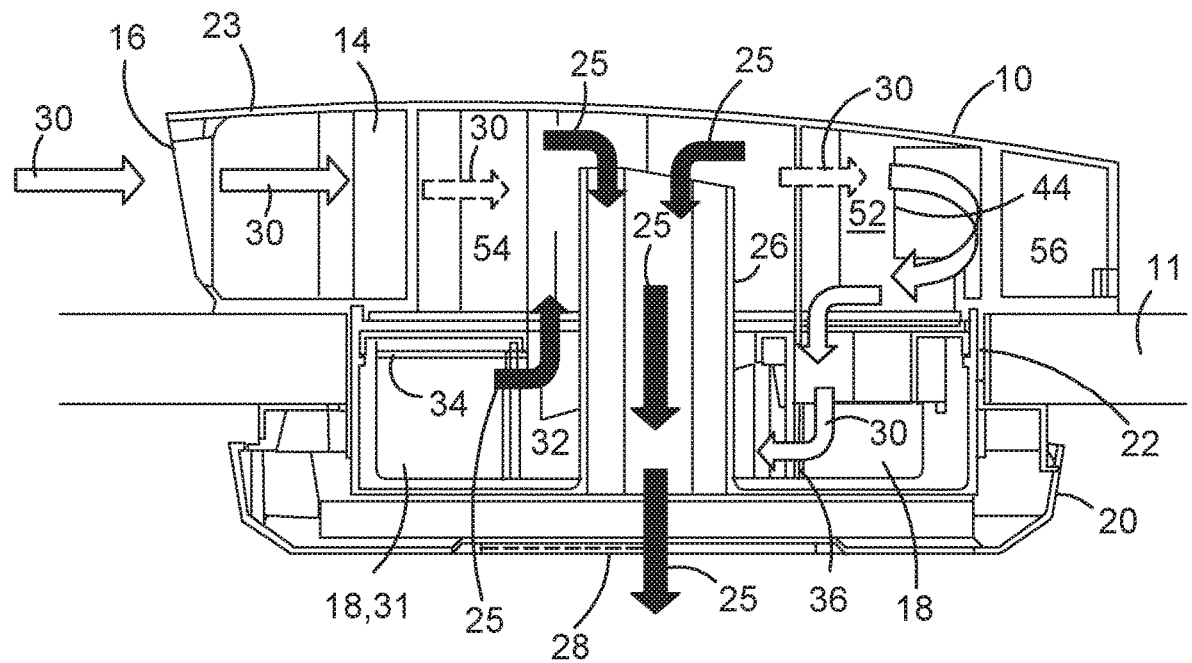
FIG. 3 is a side cross-sectional view through the center of the positive pressure vent of FIG. 2 shown in use showing the airflow.
Figure 4:
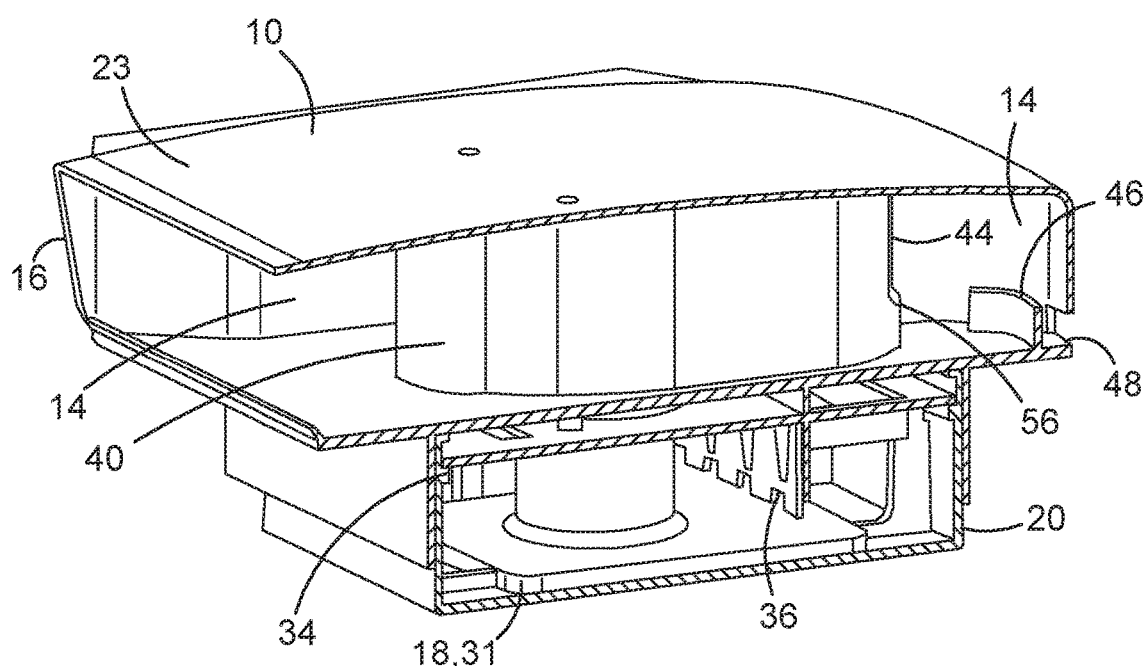
FIG. 4 is a part cut away view perspective view of the positive pressure vent of FIG. 2.
Figure 5:
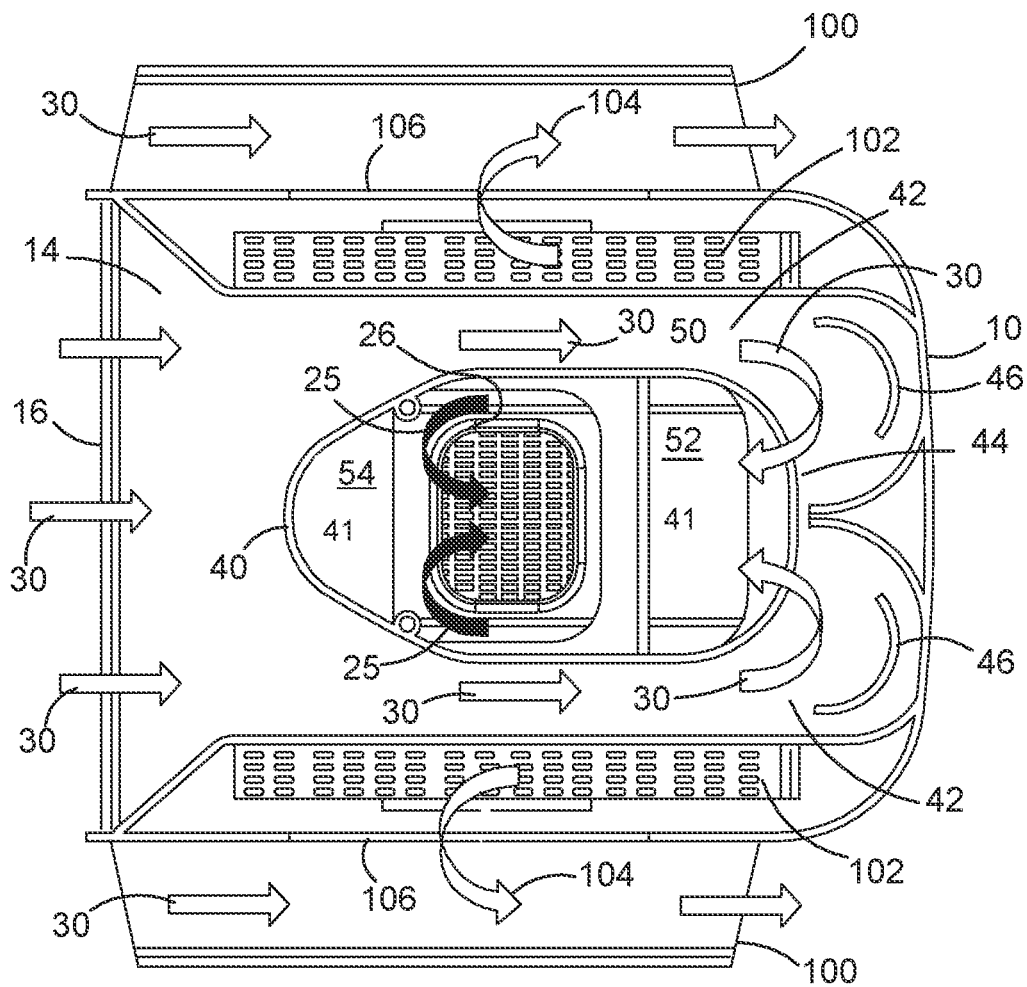
FIG. 5 is a top cross-sectional view through the center of the inlet chamber of the positive pressure vent of FIG. 2 shown in use showing the airflow.
Figure 6:
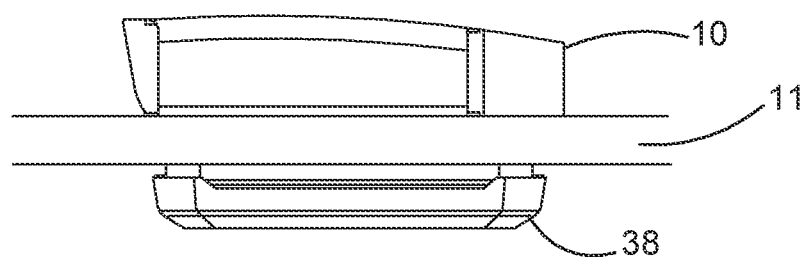
FIG. 6 is a side view of the positive pressure vent of FIG. 2, with the hinged cover closed.
Figure 7:
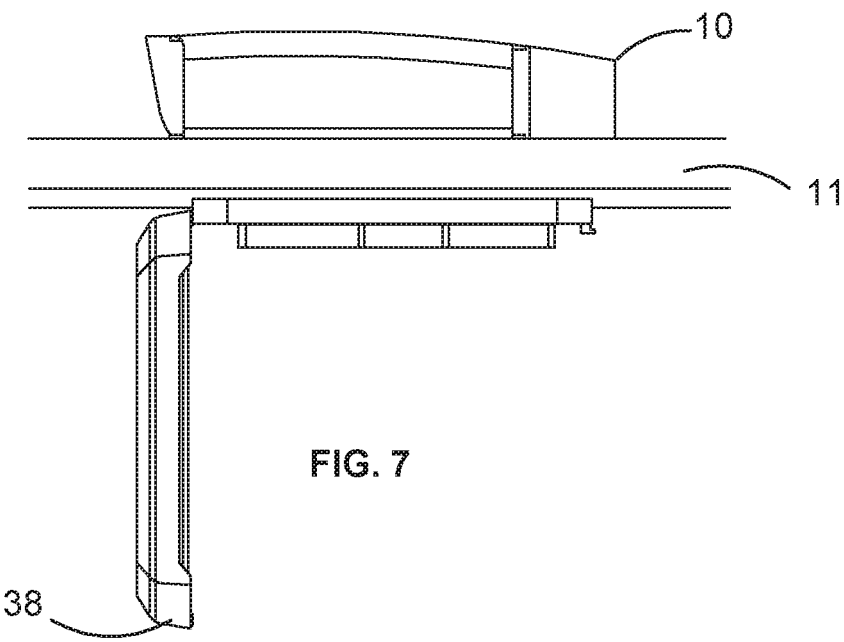
FIG. 7 is a side view of the positive pressure vent of FIG. 2, with the hinged cover open and with the filter in an installed configuration.
Figure 8:
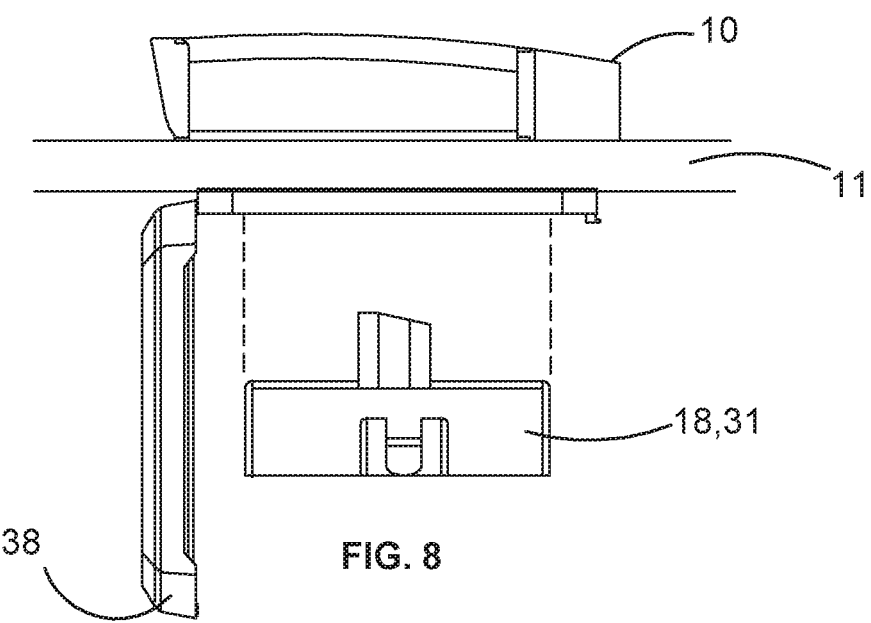
FIG. 8 is a side view of the positive pressure vent of FIG. 2, with the hinged cover open and with the filter shown in a withdrawn configuration.

Referring now to FIGS. 3 to 5, the pressure vent 10 includes an air inlet chamber 14 adapted for positioning outside the vehicle once the vent is installed. The air inlet chamber 14 has an air intake port 16 facing into an air stream generated by forward motion of the vehicle so as to collect air and form a positive pressure inside the air inlet chamber 14 by virtue of the velocity of the continually entering airstream.

The vent 10 further includes a removable filter 18 housed in a filter housing 20. As shown in FIG. 3, when the vent 10 is installed the filter housing 20 and filter 18 are both located inside the vehicle. According to some embodiments, pressurised air enters the filter 18 from the inlet chamber and is consequently filtered of any particulate matter.

In order for the filtered air to enter the vehicle, a filtered air path 25 is provided to the inside of the vehicle. The filtered air path 25 runs from the filter exit point through the filter housing and up into the inlet chamber 14. The filtered air path 25 includes cylindrical air feeder channel 26, which extends from approximately halfway into the inside the inlet chamber 14 to an outlet port 28 providing a final and straightened exit conduit for the pressurised and filtered air into the vehicle.

To allow for installation of the vent 10, an opening 22 is provided in the proposed location in between the inlet chamber 14 and the filter housing 20. As is commonly known in the art, lining elements are/or sealing compounds are typically provided to line and seal the opening 22. A fixed cover 23 as part of the inlet chamber 14, is provided to completely cover the opening 22 with a substantial overlap thereby generally preventing ingress of rain. As a result of the overlapping cover 23, the vent 10 can always be ready to operate as rain cannot enter through the opening or through the outlet port 28. Consequently, it is not necessary for the user to remember to open/close or otherwise activate the vent 10 as required in some prior art devices.

It will be appreciated that using this arrangement, air 30 enters the filter housing 20 under the urging of the positive pressure from the inlet chamber 14, and then into filter 18 where particulate matter is removed. The filtered air then leaves the filter 18 and follows the filtered air path 25 entering air feeder channel 26 to finally leave the positive pressure vent 10 and into the vehicle interior via outlet port 28. In this way, filtered air is supplied into the vehicle at a positive pressure during motion to counteract dust or particulate matter ingress through the various gaps and vents in the vehicle which also occurs during motion.

In the illustrated embodiment of FIGS. 3 to 5, the filter 18 is a removable and replaceable liquid trap filter 31 that filters the supplied air of particulate matter by passing it through a liquid 32. The liquid 32 may be water or a mix of water and an antibacterial agent and/or fragrance substance. The filter 18 is sized to filter the collected air of particulate matter while maintaining sufficient airflow and positive interior pressure.

As best shown in FIGS. 3 and 4, the liquid trap filter 31 includes a baffle 34 to contain liquid 32 splashing and the associated noise during use. Further, it is proposed that air transfer through the liquid 32 will be primarily by way of air bubbles through the liquid 32. For this reason, the liquid trap filter 31 also includes a plurality of notches 36 to promote air bubbling through the liquid once it enters from the air inlet chamber 14.

In other not shown embodiments, the filter may be a dry membrane filter or other type of filter.

With reference to FIGS. 6 to 9, it can be seen how the filter 18 of the present embodiments is removable and replaceable from the interior of the vehicle by simply unclipping hinged cover 38, pulling out the old filter and replacing it with a new one. In this way, replaceable filters are easily installed as required. Importantly, the pressure vent is adaptable to use different types of filters that simply fit into the vent in the same way. In this regard, it will be appreciated that the various types of replaceable filters should be shaped similarly as that depicted in FIGS. 6 to 9 to fit in the filter housing 20. In further embodiments, the positive pressure vent 10 includes a viewing window or indication means in order to determine if the filter requires replacement. In other not shown embodiments, the filter may be a dry membrane filter.

With reference to FIGS. 3-5, the inlet chamber 14 includes a generally oval shaped and hollow cup formation 40 centrally disposed in the inlet chamber 14. The cup formation 40 extends from the cover 23 to the base of the inlet chamber thereby defining a pair of laterally disposed narrowing air transfer channels 42 on each side of the formation 40, as best shown in FIG. 5. Due to their shape, the air transfer channels act to increase the velocity and pressure of the contained airflow relative to the velocity of the air as it enters the air intake port 16. Each air transfer channel 42 directs airflow to the rear of the inlet chamber, where it enters an outlet aperture 44 to be transferred to the filter housing 20. To assist in redirecting the airflow into the aperture entry with a minimal pressure loss, there is further provided a pair of arcuate turning formations 46 located at the rear of the inlet chamber. Advantageously, increasing the airflow velocity and pressure within the inlet chamber will assist in overcoming the pressure loss of the airflow transfer through the filter 20.

As mentioned, the cup formation 40 is hollow and therefore contains an inner space 41. The inner space is separated by wall 50 to define a non-filtered area 52 fed by outlet aperture 44 to deliver airflow to the filter 18, and a filtered area 54 fed by the filter 18 to deliver filtered airflow to the top of the air feeder channel 26. In this way, a compact separation is provided with no cross contamination.

Figure 9:
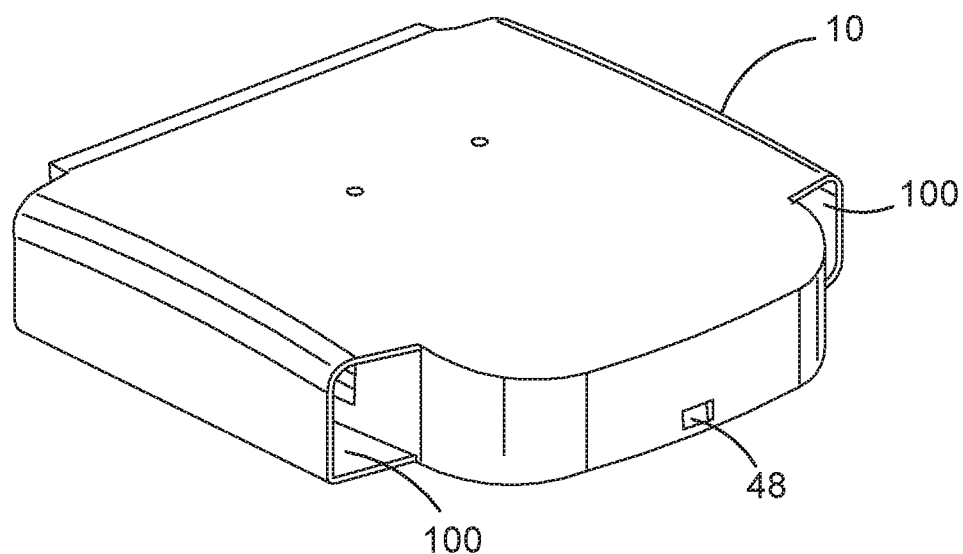
FIG. 9 is a rear perspective view of the positive pressure vent of FIG. 2.
Figure 10:
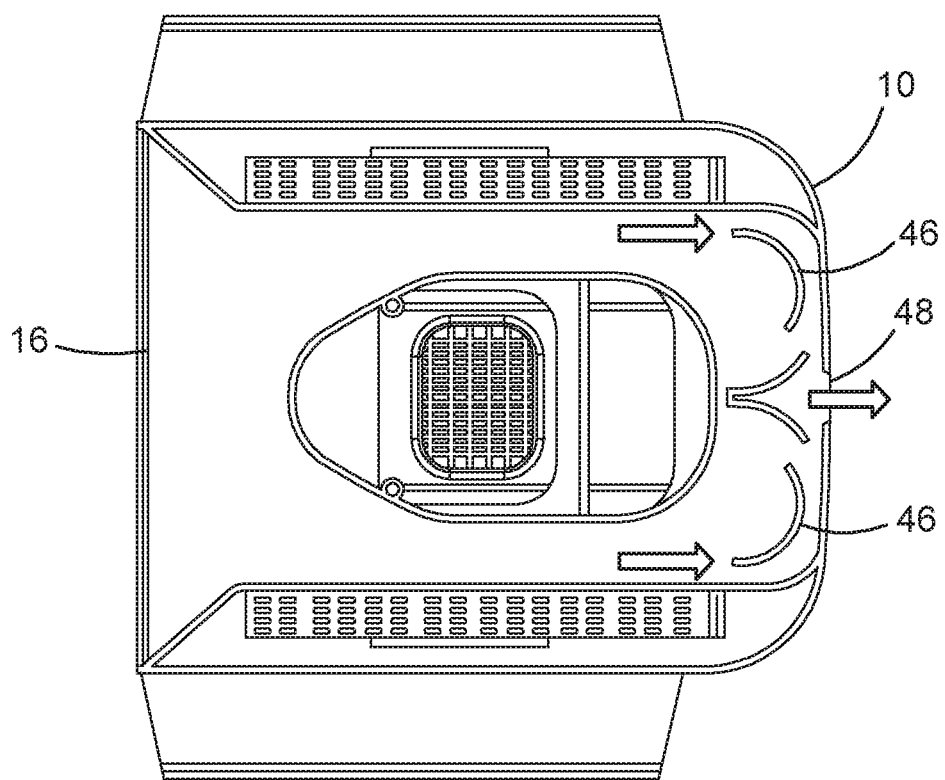
FIG. 10 is a top cross-sectional view through the centre of the inlet chamber of the positive pressure vent of FIG. 2, in use showing the path of rainwater egress.

Referring now to FIGS. 4, 9 and 10, whilst it is envisaged that rain water will not enter the inlet chamber 14 through opening 22 when the vehicle is not moving, there may be some rain water collected through the intake port 16 during forward motion of the vehicle. For this reason, inlet chamber 14 further includes at least one water extraction aperture 48 located at the rear of the inlet chamber 14 for egress of any collected water. Due to the shape of the air transfer channels 42 and the positive pressure and accelerated air flow generated, any contained rain water will be promoted to the rear of the inlet chamber to exit through the water extraction aperture 48. As should be evident, due to the provision of lip 56, any collected rainwater will not enter the outlet aperture 44. Similarly, in other not shown embodiments, the inlet chamber includes further hinged panel or otherwise access to remove any collected grit or dirt that may have accumulated over time.

It will be understood that the design of an effective filtering unit in conjunction with geometry of the intake port 16 and other aspects of the inlet chamber 14 require consideration of the desired minimum speed at which a positive pressure is maintained inside the vehicle, which depends not only on the vent itself including the air resistance provided by the filter, but also on the total size of other ingress points in the vehicle, for example refrigerator vents and the like. Persons skilled in the art will appreciate that such design parameters are arrived at by simple hydrodynamic and aerodynamic calculations in conjunction with trial and error.

Returning to FIG. 5, those familiar with the art will appreciate that recreational vehicles and caravans are required to have a minimal amount of cross flow ventilation under design regulations to ensure a minimum airflow to prevent build-up of explosive gases due to leaking gas appliances. It is for this reason that the present embodiment further includes a pair of spaced cross flow ventilation channels 100 disposed on each lateral side of the air inlet chamber 14. These cross flow ventilation channels 100 are in fluid communication with the inside of the vehicle through a ventilation path 104 and fed by ventilation inlet ports 102 as more clearly shown in FIG. 11.

Airflow through the ventilation path 104 is due to the velocity of airflow through the air channels 100 resulting from forward motion of the vehicle. This airflow draws out air from the inside of the vehicle from ventilation inlet ports 102 to exit via the cross ventilation channels 100 through ventilation exits 106. The ventilation path 104 is therefore in an opposite direction to the positive pressure airflow from the inlet chamber. In this regard, it should be noted that there will be no fluid communication between the ventilation path 104 and high pressure air path 25 from the filter 18.

Figure 11:
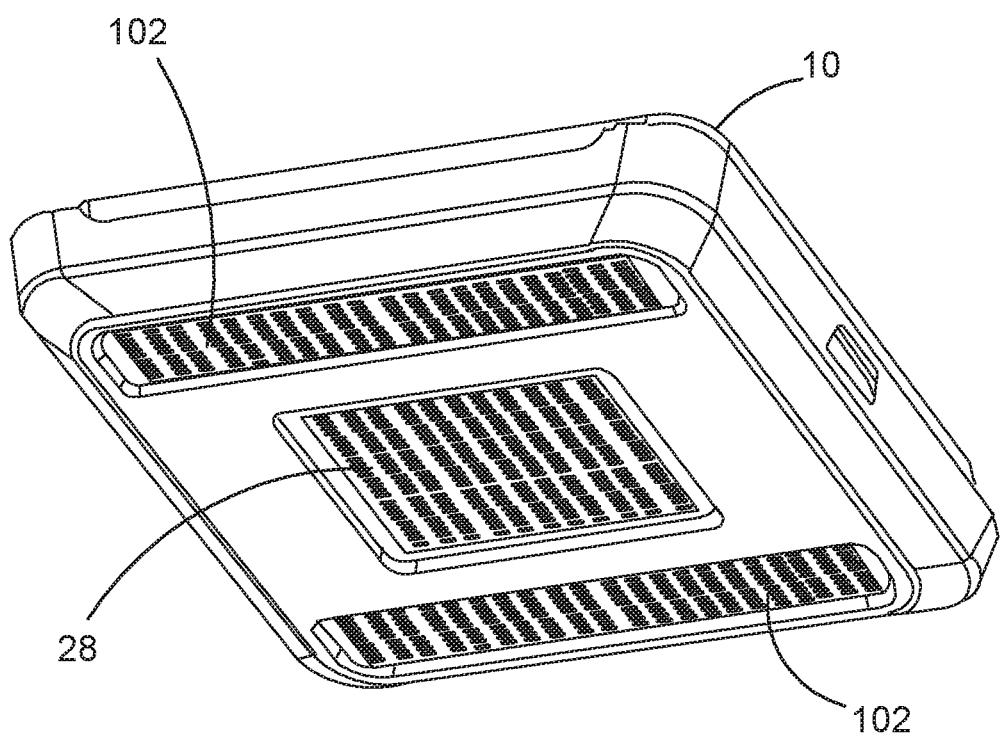
FIG. 11 is an underside perspective view of the positive pressure vent of FIG. 2.

With reference to FIG. 11, it should be noted that whilst ventilation inlet ports 102 and outlet port 28 are in close proximity to each other, the velocity and pressure of air flowing from the outlet port 28 is much higher than the airflow being drawn in through the ventilation inlet ports 102. Therefore, there will be minimal transfer between these two ports in operation.

Returning to FIGS. 3 and 4, in use, the positive pressure vent 10 of the present embodiments is easily installed in a vehicle in a roof or any other desired location that is exposed to an air stream when the vehicle is moving. Typically, installation would first involve creating the opening 22 in the vehicle external surface. In the illustrated embodiment, the inlet chamber 14 and the filter housing 20 are separate components thereby allowing the inlet chamber to be installed first from the outside of the vehicle together with appropriate lining or sealing compounds as is commonly known in the art. The filter housing is then installed from inside of the vehicle and secured to the inlet chamber using clip or screw fasteners or adhesive compounds. In other not shown embodiments, the inlet chamber and filter housing are co-formed in one piece and are therefore both installed from above the vehicle and then secured in position. The hinged cover 38 can then be installed from inside the vehicle.

Advantageously, the operation of vent 10 is automatically activated by the motion of the vehicle to deliver filtered air at a positive pressure to the inside of the vehicle. In this way, the positive pressure will counteract particulate matter ingress through the various gaps and vents throughout the vehicle, which also occur during motion of the vehicle. The positive pressure vent of the present embodiments is also water proof, insect proof, gravel proof and better dust proof efficiency than known the prior art devices. It has its own filter that is removable and replaceable. It is low cost being ideally formed from plastic injection moulded parts. It also has no moving parts, thereby making its operation extremely reliable within normal maintenance cycles.

It also has the further function of providing cross flow ventilation as required under most statutory design regulations for recreational vehicles providing a significant cost and installation advantage to recreational vehicle manufacturers who choose to install the vent of the present embodiments prior to customer delivery. The ventilation path is not able to be closed thereby to provide uninterruptible minimum ventilation for the interior of the vehicle to satisfy any safety requirements.

Although described with reference to specific examples, it will be appreciated by those skilled in the art that the invention may be embodied in many other forms.

The invention claimed is:

1. A positive pressure vent for a vehicle, including:
an air inlet chamber having an air intake port facing into an air stream generated by motion of said vehicle so as to collect air and form a positive pressure inside said air inlet chamber;
a filter adapted to filter said air from said air inlet chamber of particulate matter, said air turning downward from said air inlet chamber through said filter and upward to enter an upper end of a vertically oriented feeder channel downstream of said filter, wherein said vertically oriented feeder channel is configured to guide filtered air downwardly after said air has passed through said filter; and
a filtered air path allowing filtered air from said filter into an interior of said vehicle under urging of said positive pressure from said air inlet chamber and from said vertically oriented feeder channel.

2. A positive pressure vent according to claim 1, wherein said filter is a liquid trap filter that causes said collected air to pass through a liquid to filter out said particulate matter.

3. A positive pressure vent according to claim 2, wherein said liquid trap filter includes a baffle to minimize water splashing during use.

4. A positive pressure vent according to claim 2, wherein said liquid trap filter includes a plurality of notches to promote water bubbling.

5. A positive pressure vent according to claim 1, wherein said filter is a membrane filter that causes said collected air to pass through a membrane to filter out said particulate matter.

6. A positive pressure vent according to claim 1, wherein said filter is removable and replaceable from said interior of said vehicle.

7. A positive pressure vent according to claim 1, wherein said filter is housed in a filter housing.

8. A positive pressure vent according to claim 7, wherein said filter housing is adapted to be positioned inside said vehicle.

9. A positive pressure vent according to claim 7, wherein said filter housing includes a hinged cover for accessing and removing said filter.

10. A positive pressure vent according to claim 1, wherein said air inlet chamber includes a centrally disposed cup formation defining a narrowing air transfer channel on each lateral side of said centrally disposed cup formation for increasing velocity of said airstream within said air inlet chamber.

11. A positive pressure vent according to claim 10, wherein said centrally disposed cup formation is generally oval shaped.

12. A positive pressure vent according to claim 10, wherein said centrally disposed cup formation is hollow and includes an inner space.

13. A positive pressure vent according to claim 12, wherein said inner space is separated by a wall defining a non-filtered area and a filtered area.

14. A positive pressure vent according to claim 13, wherein said non-filtered area is in fluid communication with each of said narrowing air transfer channels and said filtered area forms part of said filtered air path.

15. A positive pressure vent according to claim 10, wherein said air inlet chamber includes an outlet aperture in fluid communication with each of said narrowing air transfer channels.

16. A positive pressure vent according to claim 15, wherein said air inlet chamber includes one or more arcuate formations for directing airflow into said outlet aperture.

17. A positive pressure vent according to claim 16, wherein said one or more arcuate formations and said outlet aperture are generally disposed at a rear of said air inlet chamber.

18. A positive pressure vent according to claim 1, wherein said air inlet chamber includes at least one water extraction aperture for egress of any collected water.

19. A positive pressure vent according to claim 1 including a cross flow ventilation channel disposed on a lateral side of said air inlet chamber.

20. A positive pressure vent according to claim 19, wherein the cross flow ventilation channel is in fluid communication with said interior of said vehicle.

* * * * *